(12) United States Patent
DeMichiel et al.

(10) Patent No.: US 6,243,710 B1
(45) Date of Patent: Jun. 5, 2001

(54) METHODS AND APPARATUS FOR EFFICIENTLY SPLITTING QUERY EXECUTION ACROSS CLIENT AND SERVER IN AN OBJECT-RELATIONAL MAPPING

(75) Inventors: Linda G. DeMichiel; Roderic G. G. Cattell, both of Los Altos, CA (US)

(73) Assignees: Sun Microsystems, Inc., Palo Alto, CA (US); Baan Development, B.V. (NL)

( * ) Notice: Subject to any disclaimer, the term of this patent is extended or adjusted under 35 U.S.C. 154(b) by 0 days.

(21) Appl. No.: 09/234,311

(22) Filed: Jan. 21, 1999

Related U.S. Application Data

(63) Continuation of application No. 09/105,955, filed on Jun. 29, 1998, now abandoned.
(60) Provisional application No. 60/068,415, filed on Dec. 22, 1997.

(51) Int. Cl.[7] .................................................... G06F 17/30
(52) U.S. Cl. .................. 707/103; 707/2; 707/3; 707/10; 707/200; 709/203
(58) Field of Search ............................... 707/2, 3, 4, 102, 707/103, 10, 200; 709/203

(56) References Cited

U.S. PATENT DOCUMENTS

| | | | |
|---|---|---|---|
| 5,452,468 | * | 9/1995 | Peterson .................................. 395/800 |
| 5,495,606 | * | 2/1996 | Borden et al. ............................ 707/2 |
| 5,592,668 | * | 1/1997 | Harding et al. ........................... 707/2 |
| 5,799,311 | * | 8/1998 | Agrawal et al. .......................... 707/102 |
| 5,857,180 | * | 1/1999 | Hallmark et al. ......................... 707/2 |
| 5,857,197 | | 1/1999 | Mullins .................................. 707/103 |
| 5,864,842 | * | 1/1999 | Pederson et al. ......................... 707/3 |
| 5,870,735 | * | 2/1999 | Agrawal et al. .......................... 707/3 |
| 5,873,076 | * | 2/1999 | Barr et al. .............................. 707/3 |
| 5,905,982 | * | 5/1999 | Carey et al. ............................. 707/4 |

FOREIGN PATENT DOCUMENTS

WO 95/04960   2/1995  (WO).

OTHER PUBLICATIONS

R.G.G. Cattell, et al., Object Database Standard: ODMG 2.0 (Morgan Kaufmann Publishers, Inc., 1997).

"Applications in Java and Extended Java", Undated, No date.

"OQL" memo from Baan, dated Sep. 15, 1997.

Abdallah Alashqur and Craig Thompson, O–R Gateway: A System For Connecting C++Application Programs and Relational Databases (USENIX C++ Technical Conference Proceedings, Aug. 10, 1992).

Rafiul Ahad and Tu–Ting Cheng, HP OpenODB: An Object–Oriented Database Management System For Commerical Applications (44 Hewlett–Packard Journal, Jun. 1993).

Xiaolei Qian and Louiqa Raschid, Query Interoperation Among Object–Oriented and Relational Databases (Proceedings of the Eleventh International Conference on Data Engineering, Mar. 6, 1995).

* cited by examiner

*Primary Examiner*—John Breene
*Assistant Examiner*—Cheryl Lewis
(74) *Attorney, Agent, or Firm*—Finnegan, Henderson, Farabow, Garrett & Dunner, L.L.P.

(57) ABSTRACT

A process receives an object-based query and creates a logical tree that contains nodes representing operations that are required for the query to be completed. Operations that can be performed by an RDBMS are transmitted to the RDBMS as an SQL query. The RDBMS executes the SQL query and returns data to the process. The process places the data into appropriate fields of one or more objects, and stores the resulting objects in a memory, such as an object cache. The process executes the remaining node operations (that could not be performed by the RDBMS) in conjunction with the objects stored in the object cache, and forwards the results to a user program.

71 Claims, 9 Drawing Sheets

METHODS AND APPARATUS FOR EFFICIENTLY SPLITTING QUERY EXECUTION ACROSS CLIENT AND SERVER IN AN OBJECT-RELATIONAL MAPPING

RELATED APPLICATIONS

This is a continuation of application Ser. No. 09/105,955, filed Jun. 29, 1998, abandoned, which claims the benefit of U.S. provisional application No. 60/068,415, filed Dec. 22, 1997, all of which are incorporated herein by reference.

The following identified U.S. patent applications are relied upon and are incorporated by reference in this application.

Provisional U.S. patent application Ser. No. 60/068415, entitled System and Method for Mapping Between Objects and Databases," filed on Dec. 22, 1997.

U.S. patent application Ser. No. 09/106,186, entitled "OBJECT-RELATIONAL MAPPING TOOL THAT PROCESSES VIEWS," U.S. Pat. No. 6,175,837, and filed on Jun. 29, 1998.

U.S. patent application Ser. No. 09/106,189, entitled "EVOLUTION OF OBJECT-RELATIONAL MAPPING THROUGH SOURCE CODE MERGING," pending, and filed on Jun. 29, 1998.

U.S. patent application Ser. No. 09/105,957, "INTEGRATING BOTH MODIFICATIONS TO AN OBJECT MODEL AND MODIFICATIONS TO A DATABASE INTO SOURCE CODE BY AN OBJECT-RELATIONAL MAPPING TOOL," pending, and filed on Jun. 29, 1998.

U.S. patent application Ser. No. 09/106,210, entitled "RULE-BASED APPROACH TO OBJECT-RELATIONAL MAPPING STRATEGIES," pending, and filed on Jun. 29, 1998.

U.S. patent application Ser. No. 09/106,212, entitled "USER INTERFACE FOR THE SPECIFICATION OF LOCK GROUPS," and filed on Jun. 29, 1998.

U.S. patent application Ser. No. 09/106,119, entitled "A FINE-GRAINED CONSISTENCY MECHANISM FOR OPTIMISTIC CONCURRENCY CONTROL USING LOCK GROUPS," pending, and filed on Jun. 29, 1998.

U.S. patent application Ser. No. 09/106,211, entitled "USER INTERFACE FOR THE SPECIFICATION OF INDEX GROUPS OVER CLASSES," pending, and filed on Jun. 29, 1998.

U.S. patent application Ser. No. 09/106,188, entitled "METHOD AND APPARATUS FOR CREATING INDEXES IN A RELATIONAL DATABASE CORRESPONDING TO CLASSES IN AN OBJECT-ORIENTED APPLICATION," pending, and filed on Jun. 29, 1998.

U.S. patent application Ser. No. 09/106,190, entitled "METHOD AND APPARATUS FOR LOADING STORED PROCEDURES IN A DATABASE CORRESPONDING TO OBJECT-ORIENTED DATA DEPENDENCIES," pending and filed on Jun. 29, 1998.

U.S. patent application Ser. No. 09/106,046, entitled "AN INTEGRATED GRAPHICAL USER INTERFACE METHOD AND APPARATUS FOR MAPPING BETWEEN OBJECTS AND DATABASES," pending, and filed on Jun. 29, 1998.

BACKGROUND OF THE INVENTION

A. Field of the Invention

This invention relates generally to computer databases and, more particularly, to methods and apparatus for providing object-based querying of a non-object-based database.

B. Description of the Related Art

Conventional, non-object-based database management systems (CDBMS) are widely used to store data. One popular type of a CDBMS, a relational database management system (RDBMS), stores data in the form of related tables. An RDBMS, however, is limited to relational (or tabular) data and does not have the sophistication required to manipulate more complex items such as objects associated with object-oriented programming languages. Some companies now provide an object-to-database mapping (ODM) system that converts objects to data and then stores the data in a CDBMS. With these systems, a software developer may to some extent integrate an object-oriented program with a CDBMS.

With both a CDBMS and an ODM system, however, data must be retrieved by using a standardized query language, such as SQL. Until now, therefore, software developers have not been able to take advantage of object-oriented programming languages to perform queries on data stored in a CDBMS. Instead, software developers have been required to formulate queries by using a standardized query language such as SQL. This approach limits software developers to the functions supported by SQL and does not allow them to take full advantages of the capabilities of object-oriented programming. Furthermore, in order to formulate SQL queries, software developers must learn how to map objects to the data stored in the DBMS.

There exists, therefore, a need for a system that allows software developers to formulate and perform object-based queries on data stored in a conventional, non-object-based DBMS.

SUMMARY OF THE INVENTION

Methods and apparatus consistent with the present invention, as embodied and broadly described herein, allow users to perform object-based querying in a distributed system having a non-object-based database management system.

In accordance with the invention, a method for performing object-based querying in a system having a non-object-based database management system comprises receiving an object-based query from a user program. The object-based query is separated into a server portion and a client portion, and the server portion is transmitted to the database management system.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. The same reference numbers may be used throughout the drawings and the following description to refer to the same or like parts.

A. Overview

Methods and apparatus consistent with the invention allow users to perform object-based querying in a distributed system having a conventional, non-object-based DBMS, such as an RDBMS. After beginning a user program initiated (UPI) transaction, a user initiates an object-based query that may be written using an object query language (OQL). A query is a predicate that determines the collection of objects or values in terms of their properties, including their relationships, and that does not explicitly specify the steps by which this collection is obtained. A query may include method invocations and may be defined in terms of other predicates, including subqueries. A standardized OQL is described, for example, in "Object Database Standard: ODMG 2.0," by R. G. G. Cattell et al., Morgan Kaufmann Publishers, Inc., 1997.

An ODM/OQL process receives this query and creates a logical tree that contains nodes representing operations that are required for the query to be completed. Operations that can be performed by the RDBMS are transmitted to the RDBMS, preferably as an SQL query. The RDBMS executes the SQL query and returns data to the ODM/OQL process.

The ODM/OQL process receives data from the RDBMS, places it into appropriate fields of one or more objects, and stores the resulting objects in a memory, such as an object cache. The ODM/OQL process executes the remaining node operations (that could not be performed by the RDBMS) in conjunction with the objects stored in the object cache. The ODM/OQL process then forwards the results to the user program. When the user program has completed the UPI transaction, it commits the data to the RDBMS.

Methods and apparatus consistent with the invention also provide different types of concurrency control. One approach employs a pessimistic concurrency control model. In this model, the RDBMS locks any necessary data items and relinquishes those locks only when the UPI transaction, including all required queries, is complete. Another approach employs a repeatable-read optimistic concurrency control model. In this model, the ODM/OQL process confirms that data received from the RDBMS matches the data previously stored in the object cache. Another approach employs a read-committed optimistic concurrency control model. In this approach, if the object cache is updated by the user program, the ODM/OQL process ensures that subsequent queries that are part of the same UPI transaction receive the same updated data as contained in the object cache.

B. Architecture

Figure 1:
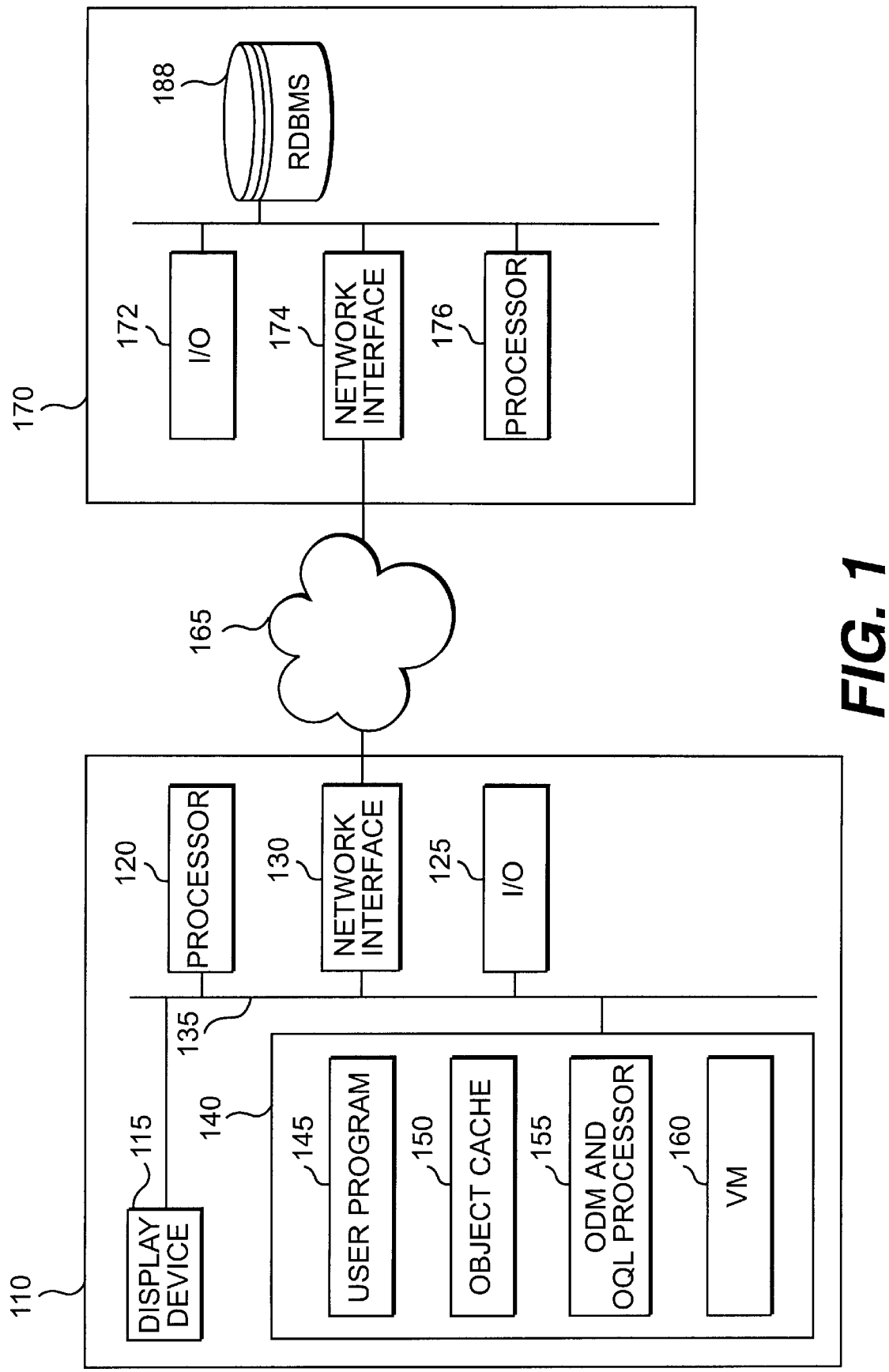
FIG. 1 is a block diagram of a data processing system in which systems consistent with the invention may be implemented.

FIG. 1 is a block diagram of a system in which the present invention may be implemented. System 100 comprises a client 110 connected to a server 170 via a network 165. Examples of network 165 include a local area network, a wide area network, or an internetwork such as the Internet.

Server 170 comprises an I/O interface 172, a network interface 174, a processor 176, and an RDBMS 188, each of which is connected to a bus 186. RDBMS 188 contains a plurality of tables of data. RDBMS 188 also receives SQL queries, executes the queries based on data stored in tables, and returns the resulting data.

Client 110 comprises a display device 115, a processor 120, an input/output (I/O) interface 125, a network interface 130, and a memory 140, each of which is connected to a bus 135. Memory 140 comprises an object cache 150, a user program 145, an ODM/OQL process 155, and a virtual machine 160. Object cache 150 is used to store objects for user program 145 or for ODM/OQL process 155.

User program 145 begins a UPI transaction, issues one or more OQL queries, and then completes the UPI transaction. In one implementation, user program 145 is created using the Java™ programming language. The Java programming language is described in a text entitled "The Java™ Tutorial" by Mary Campione and Kathy Walrath, Addison-Wesley, 1996.[1]

[1] Sun, Sun Microsystems, Sun Microsystems Corporation, JavaSoft, the Sun Logo, and Java are trademarks or registered trademarks of Sun Microsystems, Inc. in the United States and other countries.

ODM/OQL process 155 provides an interface between the object-based OQL queries issued by user program 145 and the data stored in tables in RDBMS 188. In one implementation, ODM/OQL process 155 is created using the Java™ programming language. Although this application shows the ODM and the OQL combined into one process, those skilled in the art will recognize that the two may be separate.

VM 160 is a virtual machine that provides an interface between a platform-independent process (such as a user program created using the Java programming language) and a specific platform. In one implementation, VM 160 is the Java™ Runtime Environment, which includes the Java™ Virtual Machine (JVM) and Java™ class libraries. The JVM is described in a text entitled "The Java Virtual Machine Specification," by Tim Lindholm and Frank Yellin, Addison Wesley, 1996.

C. Architectural Operation

Figure 2:
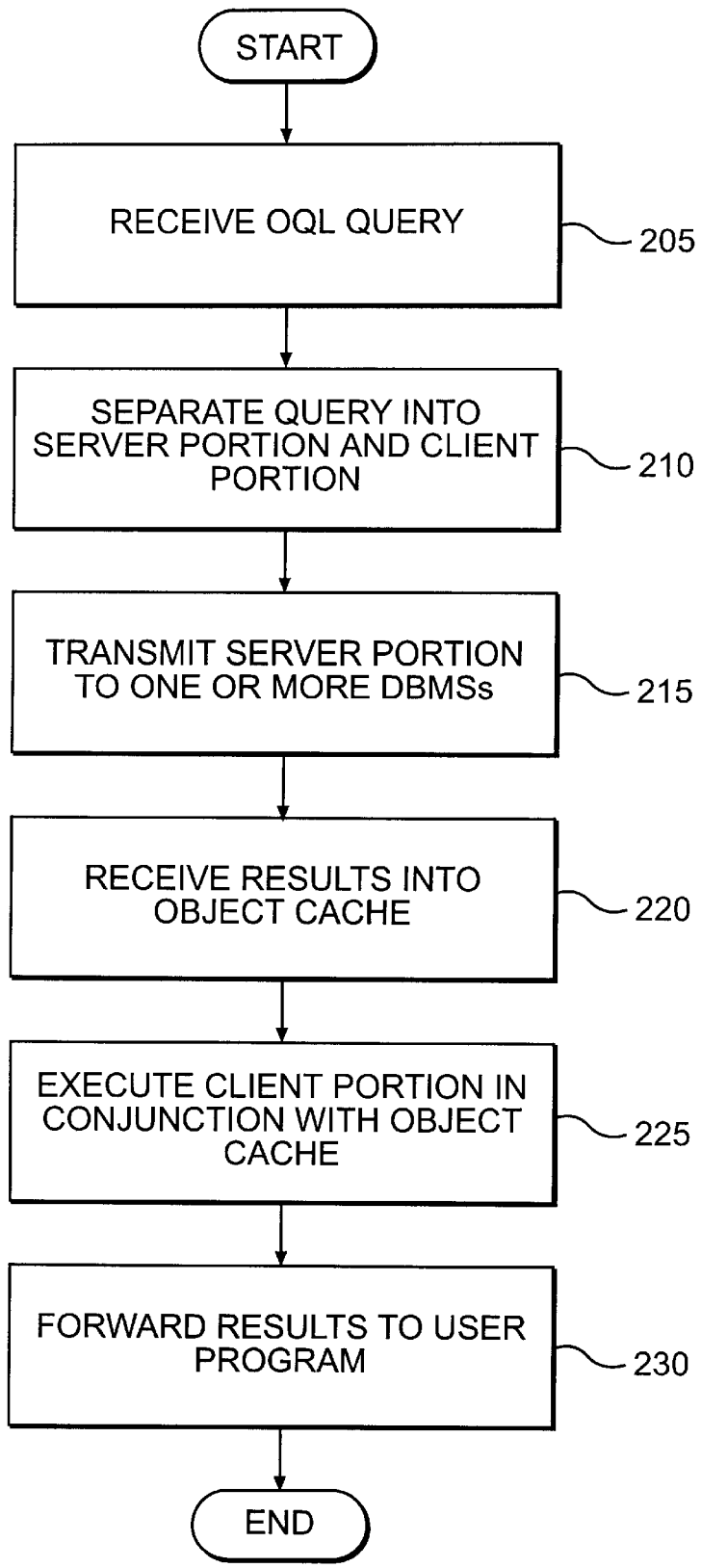
FIG. 2 is a flow diagram for performing an object-based query consistent with the invention.

FIG. 2 is a flow diagram for performing object-based querying consistent with the present invention. After user program 145 begins a UPI transaction, it issues an OQL query. This OQL query is received by ODM/OQL process 155 (step 205). As described in further detail below in reference to FIG. 3, ODM/OQL process 155 separates the OQL query into one or more server portions and one or more client portions (step 210). ODM/OQL process 155 then transmits the server portions to one or more CDBMSs, such as RDBMS 188 (step 215). RDBMS 188 executes the server portion and provides the resulting data set to ODM/OQL process 155.

ODM/OQL process 155 receives the resulting data set, converts it into one or more objects, and stores the objects in object cache 150 (step 220). ODM/OQL process 155 executes the client portion of the OQL query in conjunction with the objects stored in object cache 150 (step 225), thereby creating one or more resulting objects and completing the OQL query. Finally, ODM/OQL process 155 forwards the results of the OQL query to user program 145 (step 230). This may be done, for example, either by providing user program 145 with a reference to the resulting objects or by providing user program 145 with copies of the actual resulting objects.

Figure 3:
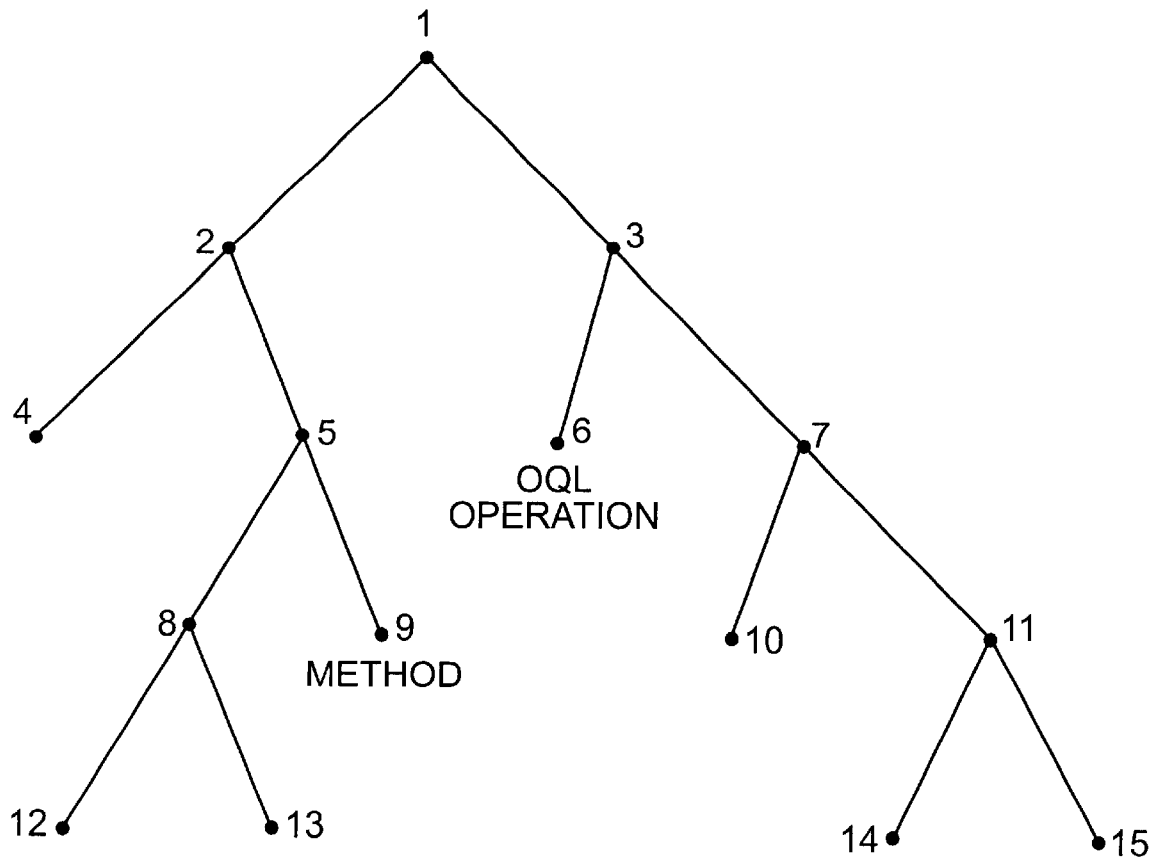
FIG. 3 is a block diagram of a logical query tree consistent with the invention that may be used to separate an object query language query into a server portion and a client portion.

FIG. 3 is a diagram of a logical query tree consistent with the invention that may be used to separate an OQL query into a server portion and a client portion. The process for creating a logical tree from a query is well understood in the art, and is described, for example, in "The Theory of Relational Databases" by David Maier, Computer Science Press, 1983. Accordingly, the description in reference to FIG. 3 assumes that an OQL query has been converted into a logical tree.

In the example shown in FIG. 3, the OQL query tree contains nodes 1–15, each of which represent operations to be performed. Furthermore, the nodes of the OQL query tree form "subtrees." For example, node 2 (and its subnodes 4–5, 8–9, and 12–13) and node 3 (and its subnodes 6–7, 10–11, and 14–15) each represents a "subtree" of the OQL tree represented by node 1. Similarly, node 5 (and its subnodes 8–9, and 12–13) represents a subtree of the tree represented by node 2. In order to complete the OQL query, the operation associated with each node must be performed.

In one implementation, it is desirable to have as many operations performed by RDBMS 188 as possible; in other words, the server portion should contain all operations that are supported by SQL. This may be achieved by including in the server portion all subtrees that require only operations that are supported by SQL.

In the example shown in FIG. 3, node 6 requires an operation that is supported by OQL and that cannot be parsed into any SQL portion. Similarly, node 9 requires an operation (a method call) that is not supported by SQL. The remaining nodes (2–5, 7–8, 10–15) require operations that are supported by SQL. Thus, the subtrees represented by nodes 4, 7, and 8 may be included in the server portion because these subtrees require only operations that are supported by SQL. In other words, these subtrees do not contain any nodes that represent non-SQL supported operations.

In contrast, the operation represented by nodes 6 and 9 are not supported by SQL, and therefore must be included in the client portion. The operation represented by node 3 depends on the operation represented by node 6, and therefore must also be included in the client portion. Similarly, the operation represented by node 5 depends on the operation represented by node 9, and therefore must also be included in the client portion. The operation represented by node 2 depends on the operation represented by node 5 (which, in turn depends on the non-SQL supported operation represented by node 9), and therefore must also be included in the client portion.

The description in reference to FIG. 3 is illustrative only. Those skilled in the art will recognize that operations required for an OQL query may be separated in other manners that are consistent with the invention. For example, it may be desirable to perform certain SQL portions on client 110 rather than on server 170.

An RDBMS is frequently used in a multi-user environment, with each user having concurrent access to data. Moreover, any given UPI transaction may require multiple queries before the transaction is completed and modifications committed to the RDBMS. In such an environment, it is possible that another user may alter RDBMS data during the time between multiple queries within a single UPI transaction. Concurrency controls are used to help ensure that a user program obtains consistent data from the RDBMS during the course of a UPI traction. Depending on the type of concurrency control employed, a multi-user environment may appear to be a single-user environment from the perspective of the single user.

Figure 4:
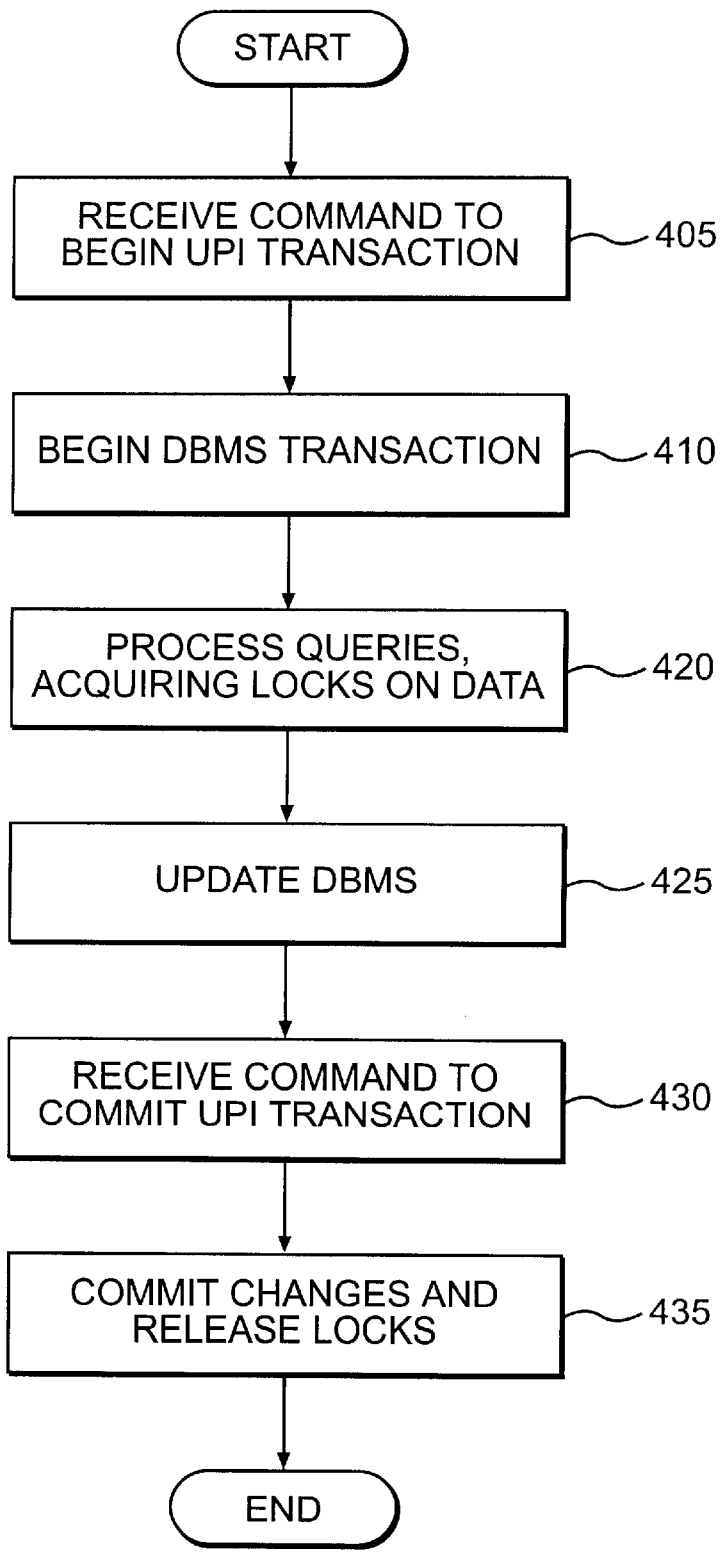
FIG. 4 is a flow diagram for a pessimistic concurrency control model consistent with the invention.
Figure 5:
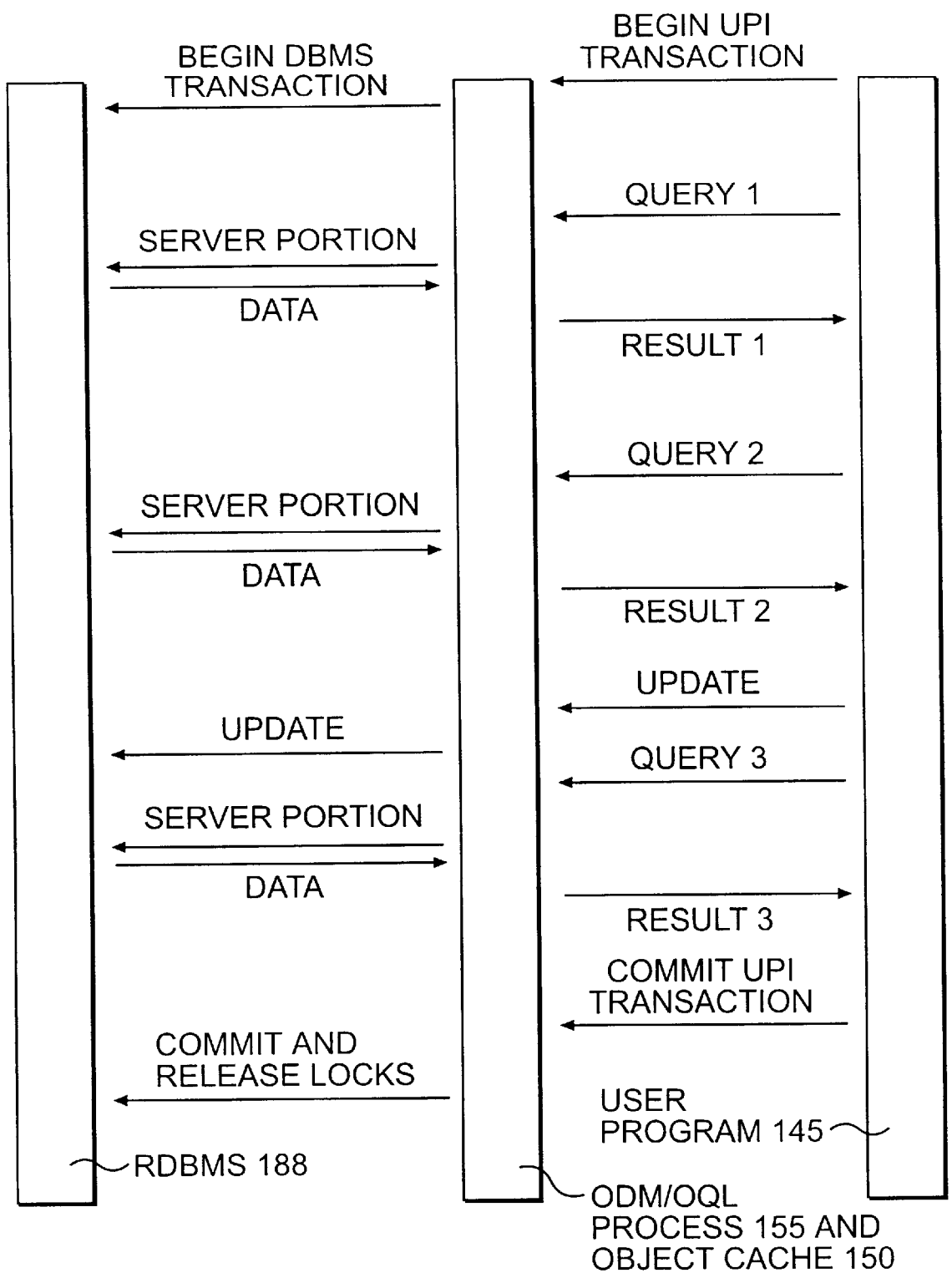
FIG. 5 is a block diagram depicting the logical flow of data in a pessimistic concurrency control model consistent with the invention.

FIG. 4 is a flow diagram of a pessimistic concurrency control model consistent with the invention. For purposes of explanation, FIG. 4 is described in connection with the logical flow of information shown in FIG. 5, which shows user program 145, ODM/OQL process 155 and object cache 150, and RDBMS 188. Under a pessimistic concurrency control model, user program 145 will perceive no changes to data (other than changes made by user program 145) because RDBMS 188 locks any required data items for the duration of the UPI transaction.

Specifically, user program 145 begins a UPI transaction, which is received by ODM/OQL process 155 (step 405). In response, ODM/OQL process 155 begins a database transaction with RDBMS 188 (step 410). ODM/OQL process 155 then receives and processes queries from user program 145 (step 420).

In particular, user program 145 initiates query 1, which is received and processed by ODM/OQL process 155. Query 1 is separated into a server portion and client portion, as explained above in reference to FIG. 3, and the server portion is transmitted to RDBMS 188. RDBMS 188 executes the server portion, locks any required data items, and returns data to ODM/OQL process 155. ODM/OQL process 155 converts the data into one or more objects, and stores the objects in object cache 150. After executing the client portion of query 1 in conjunction with object cache 150, ODM/OQL process 155 stores the resulting objects in object cache 150. ODM/OQL process 155 then returns result 1 to user program 145, as described above in reference to FIG. 2.

At some later point in the UPI transaction, user program 145 issues query 2. As described above in reference to query 1, the server portion of query 2 is passed to RDBMS 188, data is received from RDBMS 188 by ODM/OQL process 155, and result 2 is forwarded to user program 145.

Later in the UPI transaction, user program 145 issues a command to update the data. ODM/OQL process 155 receives this command, and passes it through as an update command to RDBMS 188, which updates the data (step 425). Query 3 is then completed in a manner similar to that described above in reference to queries 1 and 2. In the example shown in FIG. 5, user program 145 then commits the UPI transaction. Upon receiving this command (step 430), ODM/OQL process 155 commits the changes to RDBMS 188, which releases the locks previously obtained on the data sets (step 435).

Figure 6:
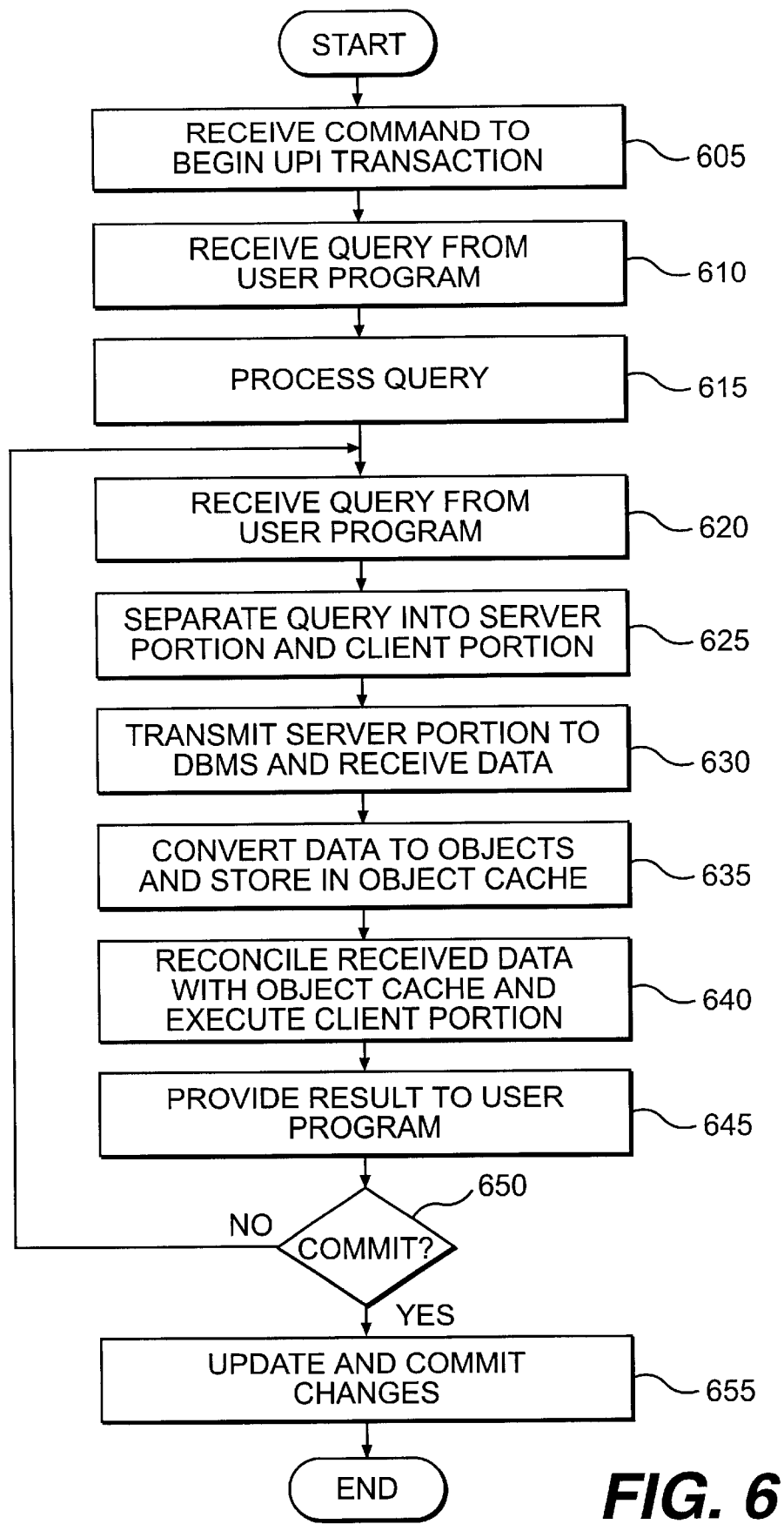
FIG. 6 is a flow diagram of a repeatable-read optimistic concurrency control model consistent with the invention.
Figure 7:
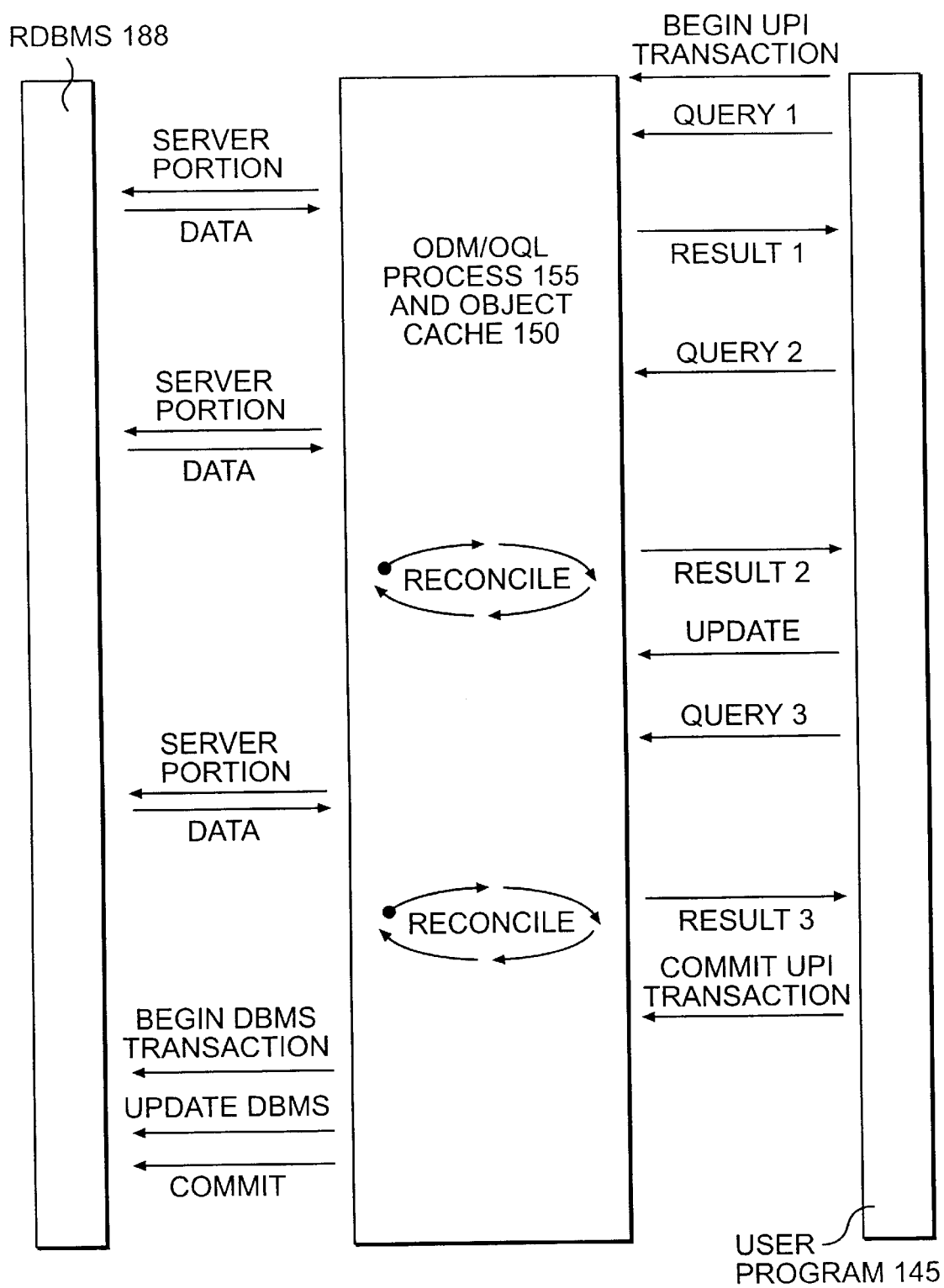
FIG. 7 is a block diagram depicting the logical flow of data in a repeatable-read optimistic concurrency control model consistent with the invention.

FIG. 6 is a flow diagram of a repeatable-read optimistic concurrency control model consistent with the invention. For purposes of explanation, FIG. 6 is described in connection with the logical flow of information shown in FIG. 7.

After the UPI transaction begins (step 605), ODM/OQL process 155 receives query 1 from user program 145 (step 610). The server portion of query 1 is passed to RDBMS 188, a data set is received from RDBMS 188 by ODM/OQL process 155, and result 1 is forwarded to user program 145. (step 615). During execution of any given server portion, such as the server portion associated with query 1, RDBMS 188 may lock the data sets associated with a query. These locks are not maintained throughout the remainder of the UPI transaction, however, as is the case with the pessimistic model of concurrency control.

At some later point, user program 145 issues query 2 to ODM/OQL process 155 (step 620), which separates query 2 into a server portion and a client portion (step 625). ODM/OQL process 155 then transmits the server portion to RDBMS 188, which executes the server portion and returns data to ODM/OQL process 155 (step 630). ODM/OQL process 155 receives the data and converts it into one or more objects (step 635). For purposes of explanation, these objects are referred to as "query 2 RDBMS objects."

ODM/OQL process 155 next reconciles the data contained in the query 2 RDBMS objects with data previously stored in object cache 150 (e.g., as a result of query 1) (step 640). Specifically, ODM/OQL process 155 determines whether any portion of the data contained in the query 2 RDBMS objects has previously been stored in object cache 150. Such a portion of data is hereinafter called the "overlapping data." If there exists any overlapping data, ODM/OQL process 155 uses the overlapping data contained in object cache 150 rather than the overlapping data in the query 2 RDBMS objects.

In one example, RDBMS 188 contains a table that includes a list of employee names, and data associated with each employee, such as salary, and gender. Query 1 may request all information for each male employee. The result of query 1 may be a plurality of "employee objects" stored in object cache 150, each of which contains a name, salary, and gender corresponding to a male employee.

Query 2 may request those employees who have a salary in excess of $100,000. The result of query 2 may be a plurality of "employee objects", each of which contains a name, salary, and gender of an employee that has a salary in excess of $100,000.

Suppose, however, that between query 1 and query 2, another user modified the salary for a particular male employee named John from $150,000 to $125,000. ODM/OQL process 155 compares the query 2 RDBMS employee objects with the employee objects previously stored in object cache 150. In doing so, ODM/OQL process 155 determines that the salary indicated for John in his query 2 RDBMS employee object differs from that indicated for John in his corresponding employee object already in object cache 150. In order to ensure that data does not change from the perspective of user program 145, ODM/OQL process 155 does not insert the query 2 RDBMS employee object for John into object cache 150.

After reconciling the data contained in the query 2 RDBMS objects with data previously stored in object cache 150, ODM/OQL process 155 executes the client portion of the OQL query in conjunction with object cache 150. ODM/OQL process 155 then forwards result 2 to user program 145, as described above in reference to FIG. 2 (step 645).

At some point later in the UPI transaction, user program 145 issues a command to update the data. ODM/OQL process 155 updates object cache 150 in response to this command, but does not issue any command to update RDBMS 188. As a result, RDBMS 188 is unaffected by the update command from user program 145. Query 3 is later processed in a manner similar to that described above for query 2. User program 145 then commits the UPI transaction (step 650); in response, ODM/OQL process 155 updates RDBMS 188 with data from object cache 150 and commits the change (step 655). Before updating RDBMS 188, ODM/OQL process 155 determines whether the data contained in RDBMS 188 is consistent with data read from RDBMS 188 during earlier portions the UPI transaction. If it is not, the UPI transaction is aborted.

Figure 8:
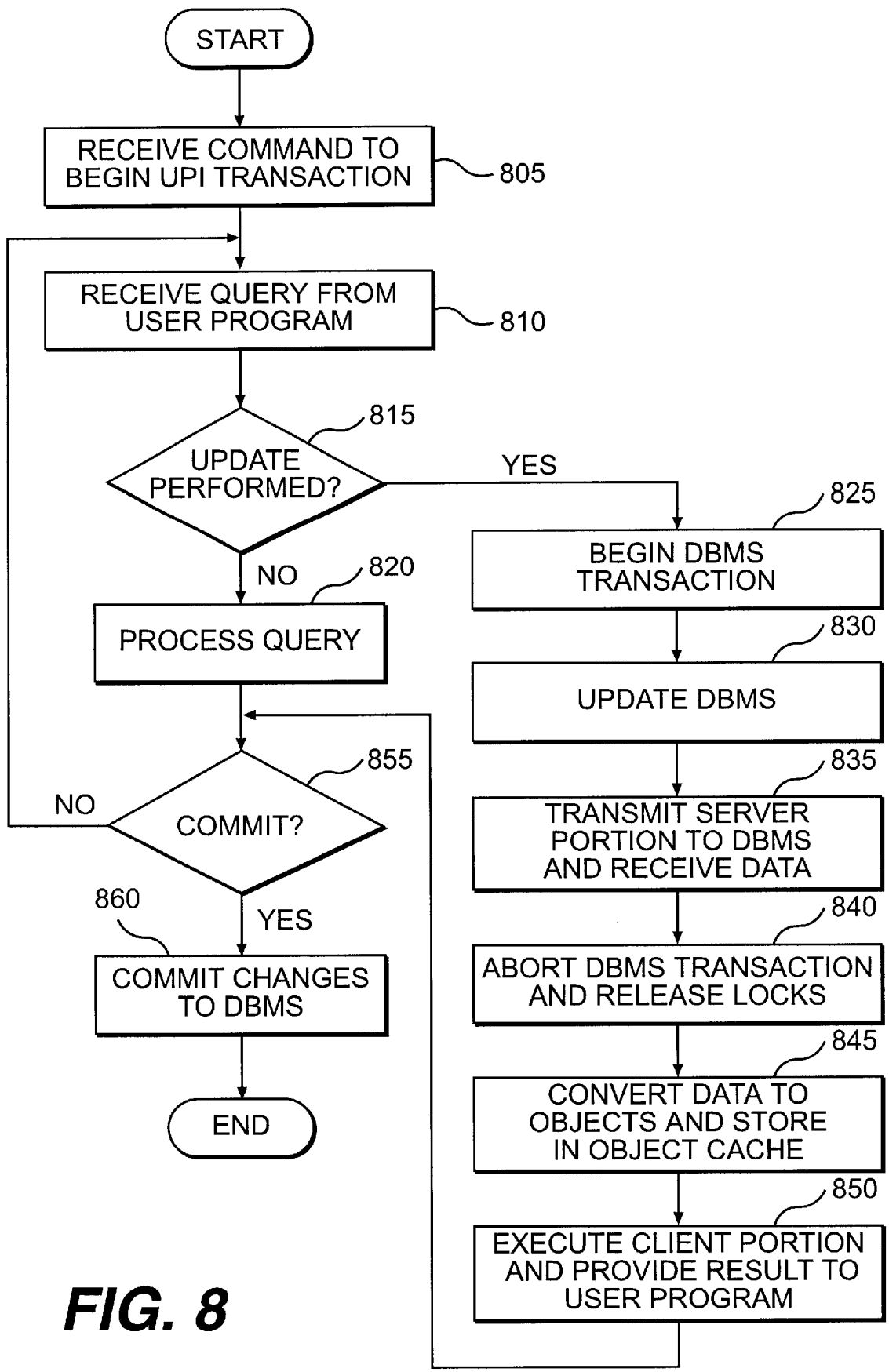
FIG. 8 is a block diagram depicting the logical flow of data in a read-committed optimistic concurrency control model consistent with the invention.
Figure 9:
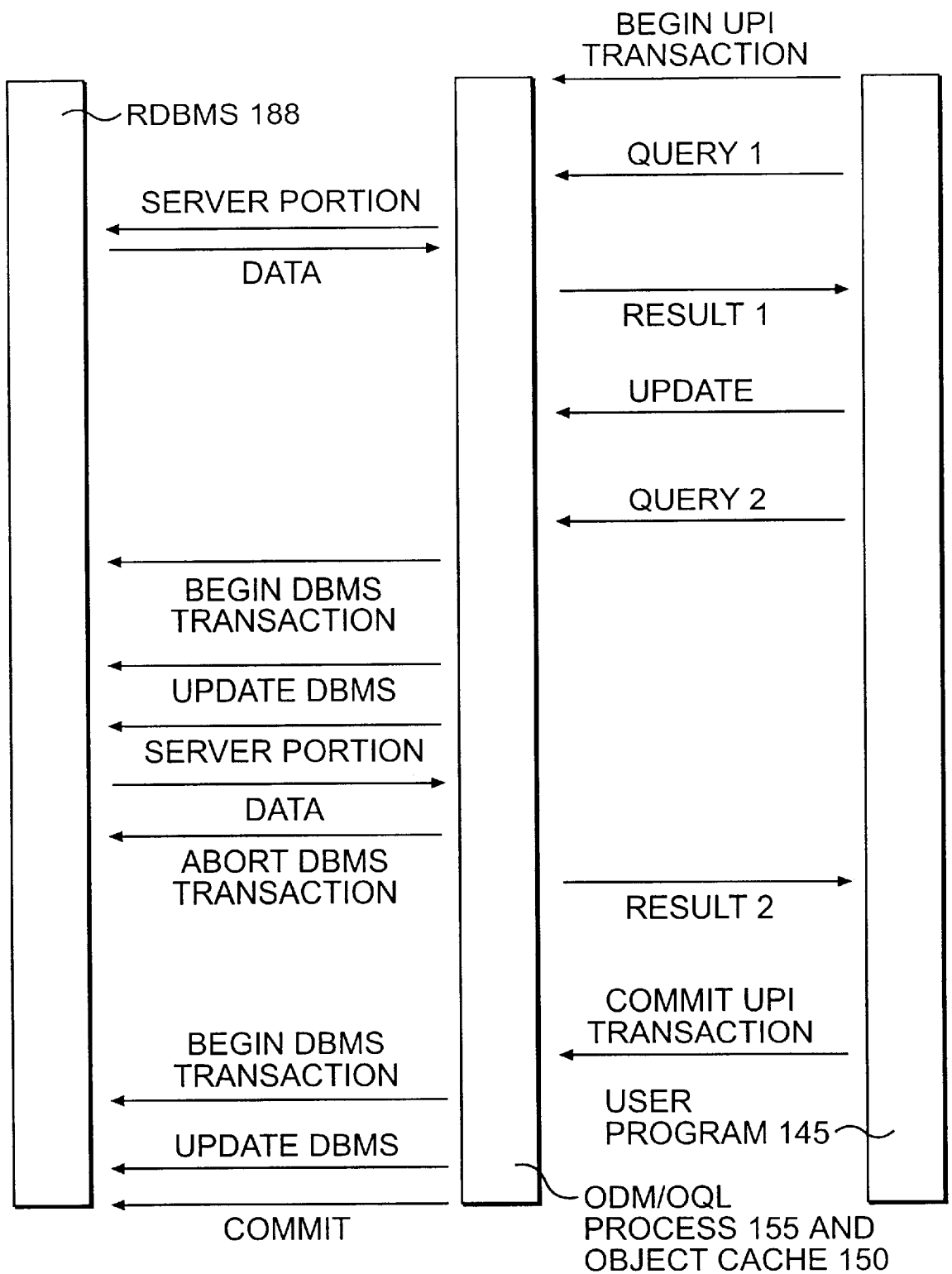
FIG. 9 is a block diagram depicting the logical flow of data in a read-committed optimistic concurrency control model consistent with the invention.

FIG. 8 is a flow diagram of a read-committed optimistic concurrency control model consistent with the present invention. For purposes of explanation, FIG. 8 is described in connection with the logical flow of information shown in FIG. 9.

After the UPI transaction begins (step 805), ODM/OQL process 155 receives query 1 from user program 145 (step 810). The server portion of query 1 is passed to RDBMS 188, data is received from RDBMS 188 by ODM/OQL process 155, and result 1 is forwarded to user program 145 (step 815). As explained above in reference to FIG. 6; RDBMS 188 may lock the data items associated with a query.

Until an update command is received from user program 145 (step 815), all subsequent queries are processed in the same manner described above in reference to query 1 in FIG. 8. As a result, pre-update queries receive data that has been committed to RDBMS 188. When an update command is received from user program 145, ODM/OQL process 155 updates object cache 150 but does not update RDBMS 188.

If a query is received after an update command, the procedure may differ from that for pre-update queries. Because the update command was not passed through to RDBMS 188, the data contained in object cache 150 may differ from that received from RDBMS 188. To account for this, when ODM/OQL process 155 receives a post-update query (such as query 2 shown in FIG. 9), it begins a database transaction with RDBMS 188 (step 825) and updates RDBMS 188 by flushing the data contained in object cache 150 (step 830). ODM/OQL process 155 then transmits the server portion of query 2 to RDBMS 188 and receives the resulting data (step 835). Once it has received the resulting data, ODM/OQL process 155 aborts the database transaction (step 840), thereby rolling back RDBMS 188 to the state that existed before RDBMS 188 was updated by flushing object cache 150.

ODM/OQL process 155 converts the data received from RDBMS 188 into one or more objects and stores them in object cache 150 (step 845). ODM/OQL process 155 then executes the client portion of query 2 in conjunction with object cache 150 and forwards result 2 to user program 145 (step 850). At some later point, ODM/OQL process 155 receives a commit command from user program 145 (step 855). In response, ODM/OQL process 155 begins a database transaction with RDBMS 188, updates RDBMS 188 by flushing the data contained in object cache 150, and commits the change to RDBMS 188 (step 860).

FIG. 8 is presented for purposes of illustration, and those skilled in the art will recognize that variations are possible consistent with the invention. Other methods and apparatus for handling post-update queries may also be used consistent with the invention. For example, rather than aborting the database transaction after receiving data from RDBMS 188 for the server portion of query 2, ODM/OQL process 155 may maintain open the database transaction until a commit command is received from user program 145. There may also exist alternate approaches that do not flush cache updates to the database.

D. Conclusion

As described in detail above, methods and apparatus consistent with the present invention allow users to perform object-based querying in a distributed system having an RDBMS. The foregoing description of an implementation of the invention has been presented for purposes of illustration and description. Modifications and variations are possible in light of the above teachings or may be acquired from practicing the invention.

For example, the detailed description describes an ODM that executes on the same machine as a user program, but that need not be the case. Furthermore, the foregoing description is based on the Java™ programming environment, OQL, SQL, and an RDBMS; but those of skill in the art will recognize that another programming environment, object-based query language, standardized query language, and non-object-based DBMS, respectively, may be used consistent with the invention. Furthermore, although the description is based on the server portion including SQL operations, the server portion could also include OQL operations. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for performing object-based querying in a system having a non-object-based database management system, comprising the steps of:

receiving an object-based query from a user program;

parsing the object-based query to create a logical tree of operations that are required to complete the object-based query;

determining subtrees that contain only operations that may be performed by the database management system;

including in a server portion the operations associated with the determined subtrees;

including in a client portion the operations not included in the server portion; and transmitting the server portion to the database management system.

2. The method of claim 1, further comprising the steps of:

obtaining from the database management system a data set that corresponds to the server portion;

forming at least one object from the data set; and storing the object in a memory.

3. The method of claim 2, further comprising the step of executing the client portion in conjunction with the memory to generate at least one resulting object.

4. The method of claim 3, further comprising the step of storing the resulting object in a memory.

5. The method of claim 4, further comprising forwarding to the user program the at least one resulting object.

6. The method of claim 3, further comprising providing a reference to the resulting object.

7. The method of claim 2, further comprising the steps of:

determining if there exists any overlapping data between the data set of the formed object and a second data set associated with another query; and using the overlapping portion of the formed object if there exists any overlapping data.

8. The method of claim 2, further comprising the steps of:

receiving a second object-based query from the user program;

separating the second object-based query into a second server portion and a second client portion;

transmitting the second server portion to a database management system;

obtaining a second data set corresponding to the second server portion from the database management system;

determining if there exists any overlapping data between the second data set and the data contained in the memory; and using the overlapping portion of the memory if there exists any overlapping data.

9. The method of claim 2, further comprising the steps of:

receiving a command from a user program to update the memory;

updating the memory in response to the command;

receiving a second object-based query from the user program;

separating the second object-based query into a second server portion and a second client portion;

updating the database management system based on the contents of the memory;

transmitting the second server portion to a database management system;

obtaining a second set of data corresponding to the second server portion from the database management system; and aborting the updating of the database management system.

10. The method of claim 2, wherein the storing step comprises the step of storing the at least one object into an object cache separate from the database management system.

11. The method of claim 2, wherein the forming step comprises the steps of:

creating at least one object; and inserting the first set of data into at least one field of the at least one object.

12. The method of claim 1, further comprising the step of locking a data set in the database management system for the duration of a user transaction.

13. The method of claim 12, further comprising the step of obtaining a data set corresponding to the server portion from the database management system.

14. The method of claim 12, further comprising the steps of:

receiving a second object-based query from the user program;

separating the second object-based query into a second server portion and a second client portion;

transmitting the second server portion to the database management system; and obtaining a second data set corresponding to the second server portion from the database management system.

15. The method of claim 14, further comprising the step of unlocking the data set in the database management system.

16. The method of claim 1, wherein the receiving step comprises the step of receiving an OQL query from a user program.

17. The method of claim 1, wherein the determined subtrees contain operations that are supported by the database management system.

18. The method of claim 1, wherein the server portion includes operations that are supported by the database management system, and the client portion includes operations that are not supported by the database management system.

19. The method of claim 1, wherein the server portion includes operations that are supported by SQL, and wherein the client portion includes operations that are not supported by SQL.

20. A method for performing object-based querying in a system having a non-object-based database management system, comprising the steps of:
   receiving an object-based query from a user program;
   parsing the object-based query to create a logical tree of operations that are required to complete the object-based query;
   determining subtrees that contain only SQL operations;
   including in a server portion the SQL operations associated with the determined subtrees;
   including in a client portion the operations not included in the server portion; and
   transmitting the server portion to the database management system.

21. The method of claim 1, wherein the receiving step comprises the step of receiving an OQL query from a user program.

22. An apparatus for performing object-based querying in a system having a non-object-based database management system, comprising:
   at least one memory having program instructions, and
   at least one processor configured to use the program instructions to perform the steps of:
      receiving an object-based query from a user program;
      parsing the object-based query to create a logical tree of operations that are required to complete the object-based query;
      determining subtrees that contain only operations that may be performed by the database management system;
      including in a server portion the operations associated with the determined subtrees;
      including in a client portion the operations not included in the server portion; and
      transmitting the server portion to the database management system.

23. The apparatus of claim 22, wherein the processor is further configured to perform the steps of:
   obtaining from the database management system a data set that corresponds to the server portion;
   forming at least one object from the data set; and
   storing the object in a memory.

24. The apparatus of claim 23, wherein the processor is further configured to perform the step of executing the client portion in conjunction with the memory to generate at least one resulting object.

25. The apparatus of claim 24, wherein the processor is further configured to perform the step of storing the resulting object in a memory.

26. The apparatus of claim 25, wherein the processor is further configured to perform the step of forwarding to the user program the at least one resulting object.

27. The apparatus of claim 24, wherein the processor is further configured to perform the step of providing a reference to the resulting object.

28. The apparatus of claim 23, wherein the processor is further configured to perform the steps of:
   determining if there exists any overlapping data between the data set of the formed object and a second data set associated with another query; and
   using the overlapping portion of the formed object if there exists any overlapping data.

29. The apparatus of claim 23, wherein the processor is further configured to perform the steps of:
   receiving a second object-based query from the user program;
   separating the second object-based query into a second server portion and a second client portion;
   transmitting the second server portion to a database management system;
   obtaining a second data set corresponding to the second server portion from the database management system;
   determining if there exists any overlapping data between the second data set and the data contained in the memory; and
   using the overlapping portion of the memory if there exists any overlapping data.

30. The apparatus of claim 23, wherein the processor is further configured to perform the steps of:
   receiving a command from a user program to update the memory;
   updating the memory in response to the command;
   receiving a second object-based query from the user program;
   separating the second object-based query into a second server portion and a second client portion;
   updating the database management system based on the contents of the memory;
   transmitting the second server portion to a database management system;
   obtaining a second set of data corresponding to the second server portion from the database management system; and
   aborting the updating of the database management system.

31. The apparatus of claim 23, wherein the storing step comprises the step of storing the at least one object into an object cache separate from the database management system.

32. The apparatus of claim 23, wherein the forming step comprises the steps of:
   creating at least one object; and
   inserting the first set of data into at least one field of the at least one object.

33. The apparatus of claim 22, wherein the processor is further configured to perform the step of locking a data set in the database management system for the duration of a user transaction.

34. The apparatus of claim 33, wherein the processor is further configured to perform the step of obtaining a data set corresponding to the server portion from the database management system.

35. The apparatus of claim 33, wherein the processor is further configured to perform the steps of:
   receiving a second object-based query from the user program;
   separating the second object-based query into a second server portion and a second client portion;
   transmitting the second server portion to the database management system; and
   obtaining a second data set corresponding to the second server portion from the database management system.

36. The apparatus of claim 30, wherein the processor is further configured to perform the step of unlocking the data set in the database management system.

37. The apparatus of claim 22, wherein the receiving step comprises the step of receiving an OQL query from a user program.

38. The apparatus of claim 22, wherein the determined subtrees contain operations that are supported by the database management system.

39. The apparatus of claim 22, wherein the server portion includes operations that are supported by the database management system, and the client portion includes operations that are not supported by the database management system.

40. The apparatus of claim 22, wherein the server portion includes operations that are supported by SQL, and wherein the client portion includes operations that are not supported by SQL.

41. An apparatus for performing object-based querying in a system having a non-object-based database management system, comprising:

at least one memory having program instructions, and at least one processor configured to use the program instructions to perform the steps of:

receiving an object-based query from a user program;

parsing the object-based query to create a logical tree of operations that are required to complete the object-based query;

determining subtrees that contain only SQL operations;

including in a server portion the SQL operations associated with the determined subtrees;

including in a client portion the operations not included in the server portion; and transmitting the server portion to the database management system.

42. The apparatus of claim 22, wherein the receiving step comprises the step of receiving an OQL query from a user program.

43. A computer-readable medium containing instructions for performing object-based querying in a system having a non-object-based database management system, by:

receiving an object-based query from a user program;

parsing the object-based query to create a logical tree of operations that are required to complete the object-based query;

determining subtrees that contain only operations that may be performed by the database management system;

including in a server portion the operations associated with the determined subtrees;

including in a client portion the operations not included in the server portion; and transmitting the server portion to the database management system.

44. The computer-readable medium of claim 43, further comprising the steps of:

obtaining from the database management system a data set that corresponds to the server portion;

forming at least one object from the data set; and storing the object in a memory.

45. The computer-readable medium of claim 44, further comprising the step of executing the client portion in conjunction with the memory to generate at least one resulting object.

46. The computer-readable medium of claim 45, further comprising the step of storing the resulting object in a memory.

47. The computer-readable medium of claim 46, further comprising forwarding to the user program the at least one resulting object.

48. The computer-readable medium of claim 45, further comprising providing a reference to the resulting object.

49. The computer-readable medium of claim 44, further comprising the steps of:

determining if there exists any overlapping data between the data set of the formed object and a second data set associated with another query; and using the overlapping portion of the formed object if there exists any overlapping data.

50. The computer-readable medium of claim 44, further comprising the steps of:

receiving a second object-based query from the user program;

separating the second object-based query into a second server portion and a second client portion;

transmitting the second server portion to a database management system;

obtaining a second data set corresponding to the second server portion from the database management system;

determining if there exists any overlapping data between the second data set and the data contained in the memory; and using the overlapping portion of the memory if there exists any overlapping data.

51. The computer-readable medium of claim 44, further comprising the steps of:

receiving a command from a user program to update the memory;

updating the memory in response to the command;

receiving a second object-based query from the user program;

separating the second object-based query into a second server portion and a second client portion;

updating the database management system based on the contents of the memory;

transmitting the second server portion to a database management system;

obtaining a second set of data corresponding to the second server portion from the database management system; and aborting the updating of the database management system.

52. The computer-readable medium of claim 44, wherein the storing step comprises the step of storing the at least one object into an object cache separate from the database management system.

53. The computer-readable medium of claim 44, wherein the forming step comprises the steps of:

creating at least one object; and inserting the first set of data into at least one field of the at least one object.

54. The computer-readable medium of claim 43, further comprising the step of locking a data set in the database management system for the duration of a user transaction.

55. The computer-readable medium of claim 54, further comprising the step of obtaining a data set corresponding to the server portion from the database management system.

56. The computer-readable medium of claim 54, further comprising the steps of:

receiving a second object-based query from the user program;

separating the second object-based query into a second server portion and a second client portion;

transmitting the second server portion to the database management system; and obtaining a second data set corresponding to the second server portion from the database management system.

57. The computer-readable medium of claim 56, further comprising the step of unlocking the data set in the database management system.

58. The computer-readable medium of claim 43, wherein the receiving step comprises the step of receiving an OQL query from a user program.

59. The computer-readable medium of claim 43, wherein the determined subtrees contain operations that are supported by the database management system.

60. The computer-readable medium of claim 43, wherein the server portion includes operations that are supported by the database management system, and the client portion includes operations that are not supported by the database management system.

61. The computer-readable medium of claim 43, wherein the server portion includes operations that are supported by SQL, and wherein the client portion includes operations that are not supported by SQL.

62. A computer-readable medium containing instructions for performing object-based querying in a system having a non-object-based database management system by:

receiving an object-based query from a user program;

parsing the object-based query to create a logical tree of operations that are required to complete the object-based query;

determining subtrees that contain only SQL operations;

including in a server portion the SQL operations associated with the determined subtrees;

including in a client portion the operations not included in the server portion; and transmitting the server portion to the database management system.

63. The computer-readable medium of claim 43, wherein the receiving step comprises the step of receiving an OQL query from a user program.

64. An apparatus for performing object-based querying in a system having a non-object-based database management system, comprising:

means for receiving an object-based query from a user program;

means for parsing the object-based query to create a logical tree of operations that are required to complete the object-based query;

means for determining subtrees that contain only operations that may be performed by the database management system;

means for including in a server portion the operations associated with the determined subtrees;

means for including in a client portion the operations not included in the server portion; and means for transmitting the server portion to the database management system.

65. A method for performing object-based querying in a system having at least one non-object-based database management system, comprising the steps of:

receiving an object-based query from a user program;

parsing the object-based query to create a logical tree of operations that are required to complete the object-based query;

determining subtrees that contain only operations that may be performed by the database management system;

including in a first server portion a first set of operations associated with the determined subtrees;

including in a second server portion a second set of operations associated with the determined subtrees;

including in a client portion the operations not included in either the first server portion or the second server portion;

transmitting the first server portion to a first database management system; and transmitting the second server portion to a second database management system.

66. A method for performing object-based querying in a system having a non-object-based database management system, comprising the steps of:

receiving an object-based query from a user program;

parsing the object-based query to create a logical tree of operations that are required to complete the object-based query;

determining subtrees that contain only operations that may be performed by the database management system;

including in a server the operations associated with the determined subtrees;

including in a client portion the operations not included in the server;

transmitting the server portion to the database management system; and locking a data set corresponding to the server portion from the database management system.

67. An apparatus for performing object-based querying in a system having a non-object-based database management system, comprising:

at least one memory having program instructions, and at least one processor configured to use the program instructions to perform the steps of:

receiving an object-based query from a user program;

parsing the object-based query to create a logical tree of operations that are required to complete the object-based query;

determining subtrees that contain only operations that may be performed by the database management system;

including in a server portion the operations associated with the determined subtrees;

including in a client portion the operations not included in the server portion; and transmitting the server portion to the database management system, wherein the processor is configured to perform the step of locking a data set in the database management system for the duration of a user transaction.

68. A computer-readable medium containing instructions for performing object-based querying in a system having a non-object-based database management system, by:

receiving an object-based query from a user program;

parsing the object-based query to create a logical tree of operations that are required to complete the object-based query;

determining subtrees that contain only operations that may be performed by the database management system;

including in a server portion the operations associated with the determined subtrees;

including in a client portion the operations not included in the server portion;

transmitting the server portion to the database management system; and locking a data set in the database management system for the duration of a user transaction.

69. A method for performing object-based querying in a system having a non-object-based database management system, comprising the steps of:

receiving an object-based query from a user program;

separating the object-based query into a server portion and a client portion;

transmitting the server portion to the database management system;

obtaining from the database management system a data set that corresponds to the server portion;

forming at least one object from the data set; and storing the at least one object into an object cache separate from the database management system.

70. An apparatus for performing object-based querying in a system having a non-object-based database management system, comprising:

at least one memory having program instructions, and at least one processor configured to use the program instructions to perform the steps of:

receiving an object-based query from a user program;

separating the object-based query into a server portion and a client portion;

transmitting the server portion to the database management system;

obtaining from the database management system a data set that corresponds to the server portion;

forming at least one object from the data set; and storing the at least one object into an object cache separate from the database management system.

71. A computer-readable medium containing instructions for performing object-based querying in a system having a non-object-based database management system, by:

receiving an object-based query from a user program;

separating the object-based query into a server portion and a client portion;

transmitting the server portion to the database management system;

obtaining from the database management system a data set that corresponds to the server portion;

forming at least one object from the data set; and storing the at least one object into an object cache separate from the database management system.

* * * * *

UNITED STATES PATENT AND TRADEMARK OFFICE
CERTIFICATE OF CORRECTION

PATENT NO. : 6,243,710 B1
DATED : June 5, 2001
INVENTOR(S) : Linda G. DeMichiel and Roderic G. G. Cattell It is certified that error appears in the above-identified patent and that said Letters Patent is hereby corrected as shown below:

Column 12, claim 36,
Line 59, "claim 30" should read -- claim 35 --;

Column 15, claim 62,
Line 21, after "management system", insert a comma;

Column 16, claim 66,
Line 21, after "server", insert -- portion --; and
Line 24, after "server", insert -- portion --.

Signed and Sealed this

Fifteenth Day of January, 2002

Attest:

JAMES E. ROGAN
Director of the United States Patent and Trademark Office

Attesting Officer